(12) United States Patent
Weng

(10) Patent No.: US 12,024,003 B1
(45) Date of Patent: Jul. 2, 2024

(54) CONNECTING MECHANISM AND FOLDING PICKUP TRUCK BED COVER

(71) Applicant: Ningbo Diroan Auto Accessories Co., Ltd., Cixi (CN)

(72) Inventor: Rongjie Weng, Cixi (CN)

(73) Assignee: NINGBO DIROAN AUTO ACCESSORIES CO., LTD., Cixi (CN)

( * ) Notice: Subject to any disclaimer, the term of this patent is extended or adjusted under 35 U.S.C. 154(b) by 0 days.

(21) Appl. No.: 18/588,478

(22) Filed: Feb. 27, 2024

(30) Foreign Application Priority Data

Jun. 1, 2023 (CN) .......................... 202321375094.1
Jun. 2, 2023 (CN) .......................... 202321384868.7

(51) Int. Cl.
*B60J 7/14* (2006.01)
*B60P 7/02* (2006.01)

(52) U.S. Cl.
CPC ................. *B60J 7/141* (2013.01); *B60P 7/02* (2013.01)

(58) Field of Classification Search
CPC ....... B60J 7/14; B60J 7/141; B60J 7/16; B60J 7/1607; B60P 7/04
USPC .......................... 296/100.06, 100.08, 100.09
See application file for complete search history.

(56) References Cited

U.S. PATENT DOCUMENTS

| 5,613,541 A * | 3/1997 | Bradbury ................. E06B 9/15 160/231.2 |
| 9,895,964 B1 * | 2/2018 | Hickey .................... B60J 7/041 |
| 10,414,257 B2 * | 9/2019 | Facchinello ............ B60J 7/141 |
| 11,331,990 B2 * | 5/2022 | Carter .................... B60J 7/1607 |
| 11,345,223 B2 * | 5/2022 | Zheng .................... B60J 7/1607 |
| 11,673,459 B2 * | 6/2023 | Dylewski, II ......... B60J 7/1607 296/100.09 |
| 2019/0291550 A1 * | 9/2019 | Ma .......................... B60J 7/141 |

* cited by examiner

*Primary Examiner* — Jason S Daniels
(74) *Attorney, Agent, or Firm* — Crowell & Moring LLP

(57) ABSTRACT

Devices and systems in the technical field of vehicles for improving pickup truck bed covers are described. One device includes a first connecting assembly, a second connecting assembly, and a first plate, a second plate and a plurality of extension plates arranged in sequence. The first connecting assembly is configured to movably connect the first plate and the second plate, and the second connecting assembly is configured to movably connect the second plate and the extension plate as well as two adjacent extension plates. The first connecting assembly and the second connecting assembly are flexibly connected to reduce the possibility of damage to the connection due to vibration and improve the service life.

9 Claims, 15 Drawing Sheets

CONNECTING MECHANISM AND FOLDING PICKUP TRUCK BED COVER

PRIORITY AND RELATED APPLICATIONS

This application claims priority to Chinese Patent Application No. 202321375094.1 filed with the China National Intellectual Property Administration on Jun. 1, 2023, which is incorporated herein by reference in its entirety. This application also claims priority to Chinese Patent Application No. 202321384868.7 filed with the China National Intellectual Property Administration on Jun. 2, 2023, which is incorporated herein by reference in its entirety.

TECHNICAL FIELD

This application relates to the technical field of vehicles and vehicle spare parts, and in particular, to a folding pickup truck bed cover, a connecting mechanism and a pickup truck bed cover having the connecting mechanism.

BACKGROUND

A top of a rear bed of a pickup truck is generally open to facilitate loading of goods. However, in bad weather and harsh environments, or when anti-theft is required, a bed cover is further required on the top of the rear bed to protect the goods.

For some situations where the rear bed needs to be opened when large goods are transported and the rear bed needs to be closed in harsh environments or for anti-theft, a folding pickup truck rear bed cover is provided, including a plurality of arranged and mutually hinged cover plates that allow the bed cover to be unfolded or folded.

However, cover plates of the existing bed cover are generally connected through hinges or rotating shafts. The hinge structure is a rigid connection. During driving of the pickup truck, the connection is easily damaged due to vibration, so that the connection is not stable, reducing the service life.

In some implementations, the cover plates of the existing foldable bed cover are generally hinged through hinge connections. However, the plurality of hinge-connected cover plates need to be flipped in opposite directions to be folded and stored, which is very inconvenient to operate.

There are also cover plates that are hinged using rotating shafts. However, to facilitate one-way flipping, the structure of the rotating shaft connection requires the use of many parts, which is complex in structure and high in cost.

SUMMARY

In some embodiments, to improve the defect of low resistance to vibration of a folding pickup truck bed cover, the present disclosure provides a folding pickup truck bed cover.

This present disclosure provides a folding pickup truck bed cover that adopts the following technical solution:

A folding pickup truck bed cover is provided, including a first plate and a second plate, and further including a first connecting mechanism and an elastic connecting mechanism, where the first connecting mechanism includes a first connecting member mounted on a side of the first plate and a second connecting member mounted on a side of the second plate;

the elastic connecting mechanism is made of a material with deformation ability, and the elastic connecting mechanism includes a first connecting portion and a second connecting portion;

the first connecting member includes a first mounting portion for mounting of the first plate and an insertion portion connected to the second connecting member, the insertion portion is disposed on a side of the first connecting member away from the first mounting portion, the second connecting member includes a second mounting portion for mounting of the second plate, the second connecting member is provided with a movable groove for the insertion portion to enter or disengage, the first connecting member is provided with a first connecting groove, and the second connecting member is provided with a second connecting groove; and the first connecting portion and the second connecting portion correspond to the first connecting groove and the second connecting groove respectively, and the first connecting portion and the second connecting portion are sequentially and cooperatively engaged in the first connecting groove and the second connecting groove, so that the first connecting member and the second connecting member are movably connected.

By using the foregoing technical solution, the first connecting member and the second connecting member are respectively mounted on the adjacent sides of the first plate and the second plate, and the first connecting member and the second connecting member are connected through the deformable elastic connecting mechanism, thereby realizing flipping of the first plate and the second plate. When the first plate and the second plate are butted in parallel, the insertion portion enters the movable groove, and the elastic connecting mechanism is extruded and mounted in the first connecting groove and the second connecting groove to improve resistance to vibration and stability of the connection structure. When the first plate and the second plate are flipped, the insertion portion is separated from the movable groove, and the elastic connecting mechanism is stretched while ensuring the connection between the first plate and the second plate.

Optionally, the elastic connecting mechanism further includes an intermediate portion, the first connecting portion and the second connecting portion are respectively arranged at intervals along a length extension direction of the intermediate portion, and notches of the first connecting groove and the second connecting groove are each provided with a constriction portion that restricts the first connecting portion or the second connecting portion from being separated from the notch.

By using the foregoing technical solution, the elastic connecting mechanism is specifically connected to the first connecting member and the second connecting member by engaging both ends in the first connecting groove and the second connecting groove.

Optionally, the intermediate portion is provided with a clamping groove for clamping of the constriction portion.

By using the foregoing technical solution, the constriction portion is clamped into the clamping groove, which can improve the connection strength between the elastic connecting mechanism and the first connecting member and the second connecting member, reduce the possibility of detachment of the first plate from the second plate, and further improve the structural strength.

Optionally, two end faces of the first connecting member along a length direction are disposed through to form the first connecting groove, and two end faces of the second connecting member along a length direction are disposed through to form the second connecting groove.

By using the foregoing technical solution, the elastic connecting mechanism is slidably engaged into the first connecting groove and the second connecting groove from the end faces of the first connecting member and the second connecting member, which further improves the stability of the overall structure and facilitates mounting.

Optionally, a surface of the first connecting portion and a surface of the second connecting portion are each provided with at least one engaging protruding strip, and the engaging protruding strip extends along a length direction of the elastic connecting mechanism.

By using the foregoing technical solution, the engaging protruding strip enables the connection end to be tightly mounted in the first connecting groove and the second connecting groove, further reducing the possibility of detachment of the elastic connecting mechanism from the first connecting member and the second connecting member.

Optionally, the first connecting mechanism further includes first fixing members symmetrically mounted at two ends of the first connecting member and second fixing members symmetrically mounted at two ends of the second connecting member; the first fixing member includes a first fixing portion for mounting of corners of the first plate and a second fixing portion for mounting of an end of the first connecting member; the two second fixing members and the two first fixing members are arranged symmetrically in a one-to-one correspondence; and the second fixing member includes a third fixing portion for mounting of corners of the second plate and a fourth fixing portion for mounting of an end of the second connecting member.

By using the foregoing technical solution, after the elastic connecting mechanism is slidably engaged from the end faces of the first connecting member and the second connecting member, the two sliding ends are fixed by the first fixing member and the second fixing member respectively, thereby restricting the elastic connecting mechanism from being separated from the first connecting member and the second connecting member, which not only further improves the structural strength, but also improves the waterproof sealing performance.

Optionally, the folding pickup truck bed cover further includes a plurality of extension plates arranged and mounted on a side of the second plate away from the first plate, where a second connecting mechanism is disposed between the second plate and the extension plates and between two adjacent extension plates; the second connecting mechanism includes two symmetrically arranged third connecting members and an extension member connected between the two third connecting members; and the extension member and the third connecting members are connected through the elastic connecting mechanism.

By using the foregoing technical solution, the extension plate can increase the length of the pickup truck bed cover or shorten the length of the first plate, the second plate and the extension plate to facilitate folding when the length of the bed cover is constant. The folding part of the bed cover has a certain thickness, and the width of the extension member is set according to a quantity of extension plates, so that the first plate, the second plate and the extension plate can be flipped and folded, thereby improving the structural stability of the bed cover when folded.

Optionally, two end faces of the third connecting member along a length direction are disposed through to form a third connecting groove, two end faces of the extension member along a length direction are disposed through to form a fourth connecting groove, the first connecting portion and the second connecting portion are respectively and cooperatively engaged in the third connecting groove and the fourth connecting groove, third fixing members are symmetrically mounted at two ends of the third connecting member along the length direction, and fourth fixing members are symmetrically mounted at two ends of the extension member along the length direction.

By using the foregoing technical solution, the cooperation between the third fixing member and the fourth fixing member can restrict the elastic connecting mechanism from being separated from the third connecting member and the extension member, thereby improving the stability of the mounting structure.

Optionally, an interior of the extension member is a hollow structure, the hollow structure penetrates the two end faces of the extension member along the length direction of the extension member, a reinforcing portion is disposed inside the extension member, and the fourth fixing member is provided with an insertion groove for insertion of an end of the reinforcing portion.

By using the foregoing technical solution, making the extension member hollow can save materials and reduce costs. The reinforcing portion in the extension member is matched with the insertion groove of the fourth fixing member, further improving the structural strength of the mounting.

To sum up, the present disclosure includes at least one of the following beneficial effects:

1. The first connecting member and the second connecting member are respectively mounted on the adjacent sides of the first plate and the second plate. The first connecting member and the second connecting member are connected through the deformable elastic connecting mechanism. The flexible connection between the first plate and the second plate can reduce the possibility of damage to the connection due to vibration and increase the service life.

2. When the first plate and the second plate are butted in parallel, the insertion portion enters the movable groove and the elastic connecting mechanism is extruded and mounted in the first connecting groove and the second connecting groove, making the connection tighter and improving the structural strength of the bed cover when unfolded.

3. The elastic connecting mechanism is slidably engaged in the first connecting groove and the second connecting groove, making mounting easy and quick.

4. After the elastic connecting mechanism is mounted with the first connecting member and the second connecting member, the first fixing member and the second fixing member are mounted at both ends, and the elastic connecting mechanism is provided with the engaging protruding strip, which reduces the possibility of detachment of the elastic connecting mechanism from the first connecting member and the second connecting member, and the mounting structure is tight.

5. The extension member can improve the structural stability of the bed cover when folded.

In some embodiments, to improve the defect of the complex structure of the one-way folding bed cover, the present disclosure provides a connecting mechanism and a pickup truck bed cover having the connecting mechanism.

According to a first aspect, the present disclosure provides a connecting mechanism and a pickup truck bed cover having the connecting mechanism, and the following technical solutions are used.

A connecting mechanism is provided, configured to connect two adjacent mounted members and including two symmetrically arranged connecting units and an extension unit rotatably connected to the two connecting units, where the connecting unit includes a mounting portion for mounting the mounted member, and the extension unit includes two rotating members and an extension member connected between the two rotating members; and an end of the connecting unit away from the mounting portion is provided with a first rotating groove for cooperative rotation with the rotating member, the first rotating groove has a first notch and a first limiting portion extends from an edge of the first notch, and the first limiting portion is configured to restrict the rotating member from being separated from the first rotating groove from the first notch.

By using the foregoing technical solution, the mounted members are mounted on the connecting units, and then the two connecting units are connected through the extension unit so that a plurality of mounted members can be mounted together. The two rotating members in the extension unit cooperate with the first rotating groove of the connecting unit to realize folding and unfolding of two adjacent mounted members. In addition, the plurality of mounted members are arranged sequentially, a plurality of connecting mechanisms need to be used, and widths of the extension members in the connecting mechanisms gradually increase along an arrangement direction according to a quantity of mounted members, to implement one-way folding of the plurality of mounted members, which is easy to operate. Moreover, the connecting mechanism has a simple structure, so that costs are low.

Optionally, the extension member is set in a plate shape, the two rotating members are symmetrically arranged at two ends of the extension member, the connecting unit includes a first side located at an end away from the mounting portion and a first edge and a second edge respectively connected to two ends of the first side, and the first sides, the first edges and the second edges of the two connecting units surround and form a first accommodation cavity for accommodating the extension unit.

By using the foregoing technical solution, for a connecting mechanism when there are only two mounted members, or for a connecting mechanism between two mounted members located at the front end among a plurality of arranged mounted members, the extension member is set in a plate shape. In this case, the extension unit can be integrally formed, the connecting mechanism has fewer parts, and the structure is simple. The ends of the two connecting units that are close to each other form the accommodation cavity. When the connecting mechanism is unfolded into a horizontal state, the extension unit can enter the first accommodation cavity to reduce wear and tear on the extension unit and extend the service life.

Optionally, when the extension unit is located inside the first accommodation cavity, outer walls on two sides of the extension member abut against the first side.

By using the foregoing technical solution, when the connecting mechanism is unfolded into the horizontal state, that is, the mounted member is in an unfolded and flat state, and two sides of the extension member abut against the first side, which can limit a range of a flipping angle between the connecting unit and the extension unit, so that the mounted member can be folded and unfolded in only one direction, which can improve the structural stability in the unfolded state.

Optionally, the extension unit is made of a metal material.

By using the foregoing technical solution, the extension unit made of a metal material has a stronger structure and is less likely to deform and wear, further extending the service life.

Optionally, the extension member includes an extension portion and a connecting portion rotatably disposed at two ends of the extension portion, and the connecting portion is fixedly connected to the rotating member.

By using the foregoing technical solution, when a quantity of mounted members is more than two, an extension member in a connecting mechanism after a second mounted member along the arrangement direction has an extension portion, the connecting portion is rotatably connected to the extension portion, and the connecting portion is rotatably connected to the connecting unit, through the rotating member. In other words, the two connecting units and the extension portion can be rotatably connected, and the widths of the extension portions gradually increase along the arrangement direction of the mounted members, so that the mounted members can be folded and stored.

Optionally, the connecting portion and the rotating member are integrally formed.

By using the foregoing technical solution, when the connecting portion and the rotating member are integrally formed, the structure is more stable, a quantity of parts of the connecting mechanism can be further reduced, and the structure can be simplified.

Optionally, the connecting portion has a rotating end, the extension portion is provided with a second rotating groove for cooperative rotation with the rotating end, the second rotating groove has a second notch and a second limiting portion extends from an edge of the second notch, and the second limiting portion is configured to restrict the rotating end from being separated from the second rotating groove from the second notch.

By using the foregoing technical solution, the cooperation between the rotating end and the second rotating groove realizes the rotational connection between the connecting portion and the extension portion, and the second limiting portion reduces the possibility of detachment pf the rotating end from the second notch, so that the connection structure is simple and stable.

According to a second aspect, the present disclosure provides a pickup truck bed cover that uses the following technical solutions:

including a plurality of cover plates sequentially arranged and the foregoing connecting mechanism, where there are a plurality of connecting mechanisms and the connecting mechanisms are respectively mounted between two adjacent cover plates, and widths of extension members in the plurality of connecting mechanisms increase sequentially along an arrangement direction of the cover plates.

By using the foregoing technical solution, one-way folding and unfolding of a plurality of cover plates can be realized, which is easy to operate, has a simple connection structure, and is low in cost.

To sum up, the present disclosure includes at least one of the following beneficial effects:

1. The mounted members are mounted on the connecting units, and then the two connecting units are connected through the extension unit so that a plurality of mounted members can be mounted together. The two rotating members in the extension unit are rotatably connected to the connecting unit, and widths of the extension members gradually increase along an arrangement direction according to a quantity of mounted members, to implement one-way folding of the plurality of mounted members, which is easy to operate.

2. The connecting mechanism includes a connecting unit and an extension unit, with simple structure and low costs.

3. The rotating member cooperates with the first rotating groove of the connecting unit, and the rotating end of the connecting portion cooperates with the second rotating groove of the extension portion to implement a structurally stable rotational connection.

BRIEF DESCRIPTION OF THE DRAWINGS

The system, device, product, and/or method described below may be better understood with reference to the following drawings and description of non-limiting and non-exhaustive embodiments. The components in the drawings are not necessarily to scale. Emphasis instead is placed upon illustrating the principles of the present disclosure.

Figure 1:
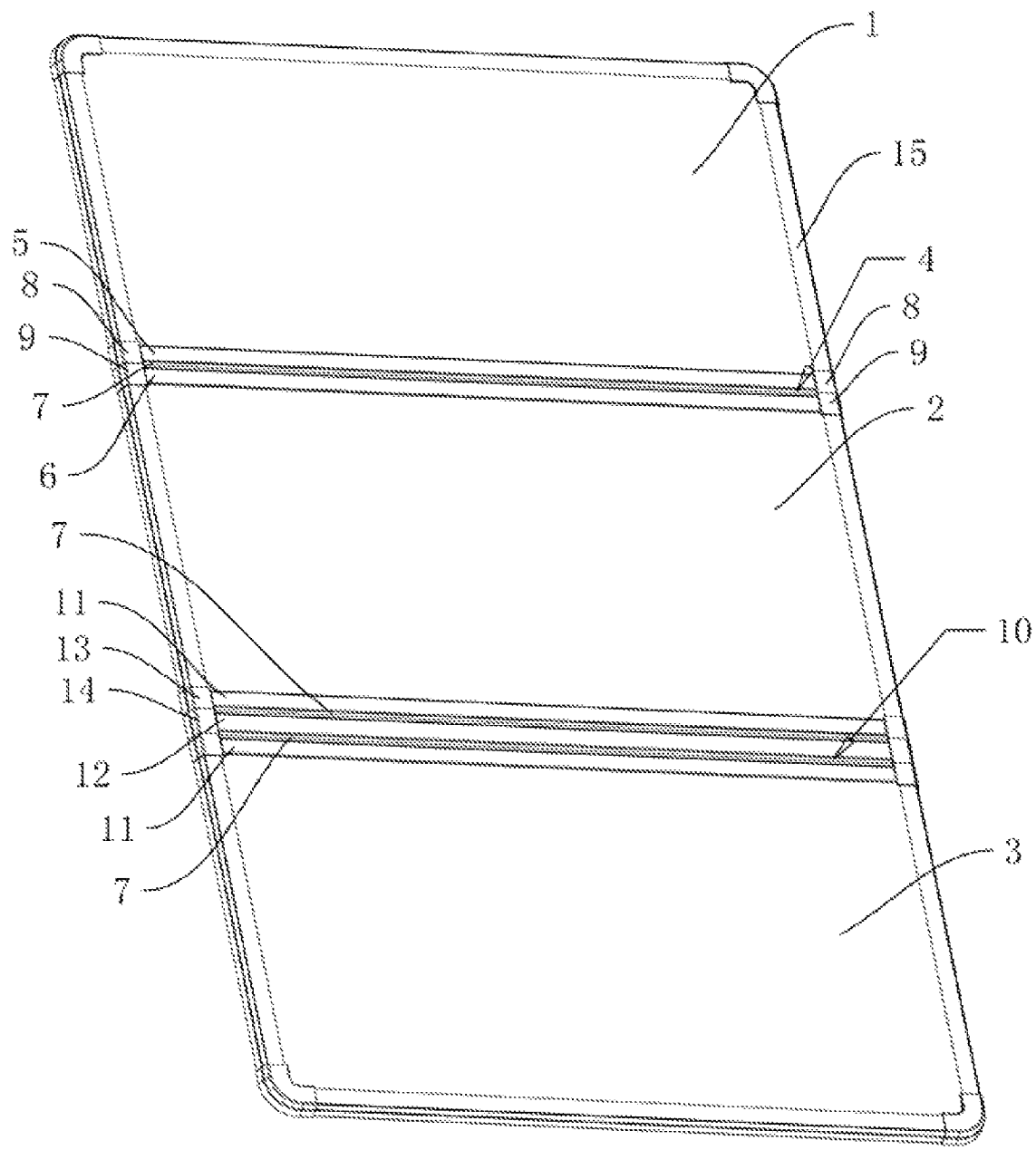
FIG. 1 is a schematic structural diagram of a folding pickup truck bed cover in an unfolded state according to an embodiment of the present disclosure.

Descriptions of reference numerals: 1: First plate; 101: Protruding portion; 102: Corner; 2: Second plate; 3: Extension plate; 4: First connecting mechanism; 5: First connecting member; 51: First mounting portion; 52: Insertion portion; 53: First connecting groove; 54: Notch; 55: Constriction portion; 6: Second connecting member; 61: Movable groove; 62: Second connecting groove; 7: Elastic connecting mechanism; 71: First connecting portion; 72: Second connecting portion; 73: Intermediate portion; 74: Engaging protruding strip; 75: Cavity; 76: Clamping groove; 8: First fixing member; 81: First fixing portion; 811: First engaging joint; 82: Second fixing portion; 821: Second engaging joint; 83: Outer plate; 9: Second fixing member; 91: Third fixing portion; 92: Fourth fixing portion; 10: Second connecting mechanism; 11: Third connecting member; 111: Third connecting groove; 12: Extension member; 121: Reinforcing portion; 122: Fourth connecting groove; 13: Third fixing member; 14: Fourth fixing member; 141: Insertion groove; 15: Edge strip; 2-1: connecting unit; 2-11: Mounting portion; 2-111: Connecting groove; 2-112: protruding strip; 2-12: First rotating groove; 2-121: First notch; 2-122: First limiting portion; 2-13: first side; 2-14: first edge; 2-15: second edge; 2-16: first accommodation cavity; 2-2: extension unit; 2-3: rotating member; 2-4: extension member; 2-41: vertical section; 2-42: horizontal section; 2-43: extension portion; 2-431: second rotating groove; 2-432: second notch; 2-433: second limiting portion; 2-434: second side; 2-435: third edge; 2-436: fourth edge; 2-44: connecting portion; 2-45: Rotating end; 2-46: Second accommodation cavity; 2-5: mounted member; 2-6: cover plate; and 2-7: edge component.

DETAILED DESCRIPTION

The disclosed systems, devices, and methods will now be described in detail hereinafter with reference to the accompanied drawings that form a part of the present application and show, by way of illustration, examples of specific embodiments. The described systems and methods may, however, be embodied in a variety of different forms and, therefore, the claimed subject matter covered by this disclosure is intended to be construed as not being limited to any of the embodiments. This disclosure may be embodied as methods, devices, components, or systems. Accordingly, embodiments of the disclosed system and methods may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. It is intended, for example, that claimed subject matter may include combinations of exemplary embodiments in whole or in part. Moreover, the phrase "in one implementation", "in another implementation", "in some implementations", or "in some other implementations" as used herein does not necessarily refer to the same implementation(s) or different implementation(s). It is intended, for example, that claimed subject matter may include combinations of the disclosed features from the implementations in whole or in part.

In general, terminology may be understood at least in part from usage in context. For example, terms, such as "and", "or", or "and/or," as used herein may include a variety of meanings that may depend at least in part upon the context in which such terms are used. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure relates to the technical field of vehicles, improves the problem of low resistance to vibration of a folding pickup truck bed cover, and discloses a folding pickup truck bed cover including a first connecting mechanism, a second connecting mechanism, and a first plate, a second plate and a plurality of extension plates arranged in sequence. The first connecting mechanism is configured to movably connect the first plate and the second plate, and the second connecting mechanism is configured to movably connect the second plate and the extension plate as well as two adjacent extension plates. In the present disclosure, the first connecting mechanism and the second connecting mechanism are flexibly connected to reduce the possibility of damage to the connection due to vibration and improve the service life.

The present disclosure relates to the technical field of vehicle spare parts, and provides a connecting mechanism and a pickup truck bed cover having the connecting mechanism. A connecting mechanism is provided, configured to connect two adjacent mounted members and including two symmetrically arranged connecting units and an extension unit rotatably connected to the two connecting units. The connecting unit includes a mounting portion for mounting the mounted member, and the extension unit includes two rotating members for cooperative rotation with the connecting units and an extension member connected between the two rotating members In addition, a pickup truck bed cover is further provided, including a plurality of cover plates sequentially arranged and the foregoing connecting mechanism, where there are a plurality of connecting mechanisms and the connecting mechanisms are respectively mounted between two adjacent cover plates, and widths of extension members in the plurality of connecting mechanisms increase sequentially along an arrangement direction of the cover plates. According to the present disclosure, the plurality of cover plates can be folded and unfolded in one direction through the connecting mechanisms, which is easy to operate, has a simple connecting structure, and is low in cost.

Referring to FIG. 1, an embodiment of the present disclosure discloses a folding pickup truck bed cover, including a first connecting mechanism 4, a second connecting mechanism 10, an elastic connecting mechanism 7, and a first plate 1, a second plate 2 and a plurality of extension plates 3 arranged in sequence. The first connecting mechanism 4 is configured to movably connect the first plate 1 and the second plate 2, and the second connecting mechanism 10 is configured to movably connect the second plate 2 and the extension plate 3 as well as two adjacent extension plates 3. The first connecting mechanism 4 and the second connecting mechanism 10 are flexibly connected through the elastic connecting mechanism 7 to improve the resistance to vibration and stability of the connection of the folding bed cover.

Figure 2:
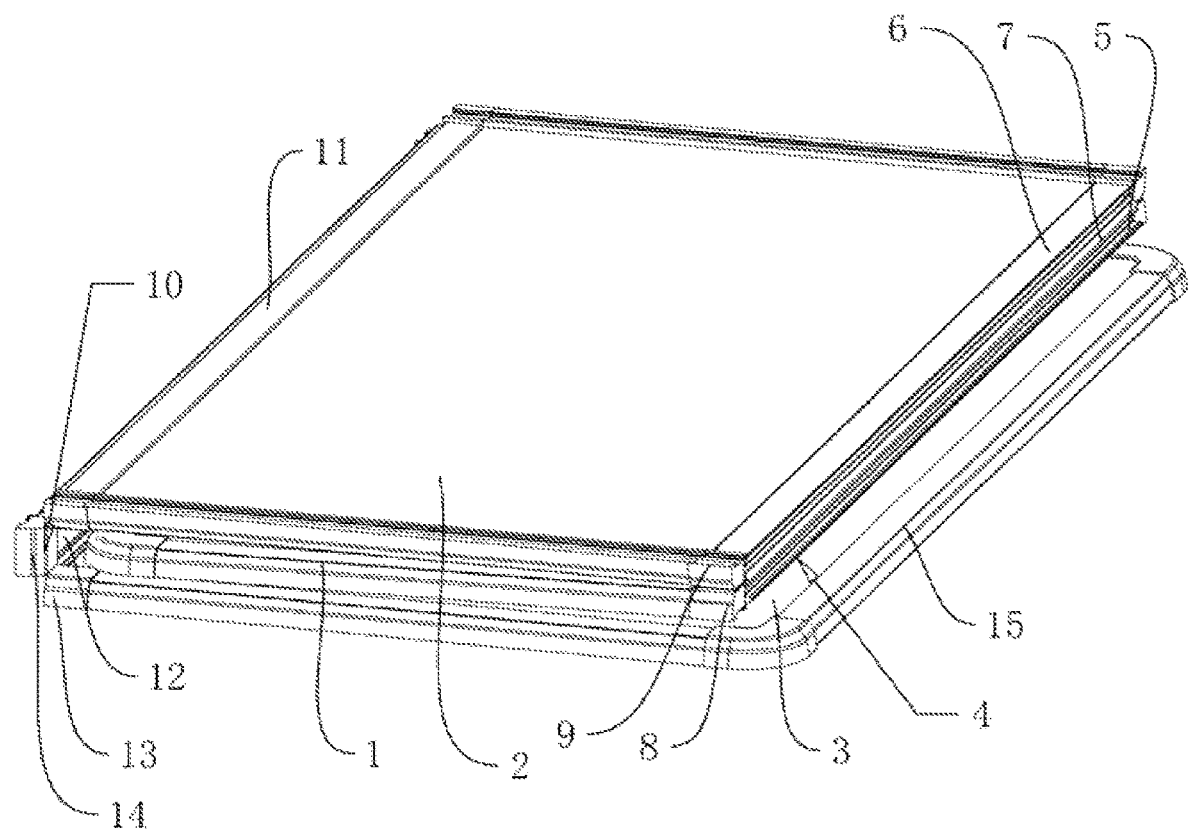
FIG. 2 is a schematic structural diagram of a folding pickup truck bed cover in a folded state according to an embodiment of the present disclosure.

Referring to FIG. 1 and FIG. 2, the folding pickup truck bed cover has an unfolded state and a folded state. In the unfolded state, the first plate 1, the second plate 2, and the extension plate 3 are arranged in parallel; and in the folded state, the first plate 1, the second plate 2, and the extension plate 3 are sequentially folded in the same direction. An edge strip 15 is mounted on the outer edge of the bed cover.

Figure 3:
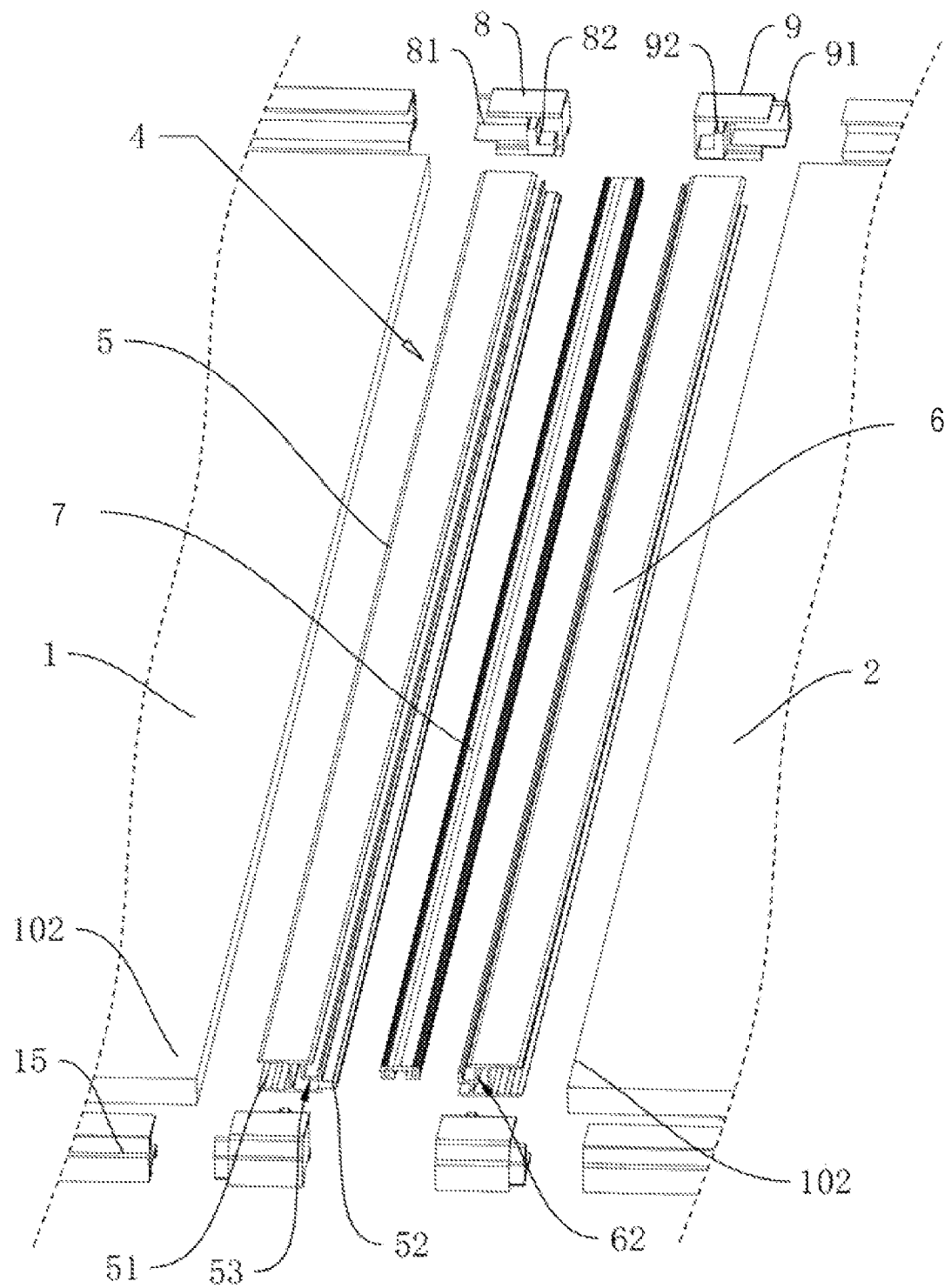
FIG. 3 is an exploded view of a structure of a first connecting mechanism according to an embodiment of the present disclosure.

Referring to FIG. 3, the first connecting mechanism 4 includes a first connecting member 5 mounted on a side of the first plate 1 and a second connecting member 6 mounted on a side of the second plate 2, and the elastic connecting mechanism 7 is connected between the first connecting member 5 and the second connecting member 6. First fixing members 8 are symmetrically mounted on two short sides of the first connecting member 5, and second fixing members 9 are symmetrically mounted on two short sides of the second connecting member 6. The length of the first connecting member 5 is shorter than the length of the first plate 1 so that the end face of the first connecting member 5 and the end face of the first plate 1 leave a portion for the first fixing member 8 to be mounted. The second connecting member 6 and the first connecting member 5 have the same length and are correspondingly mounted on the second plate 2.

Figure 4:
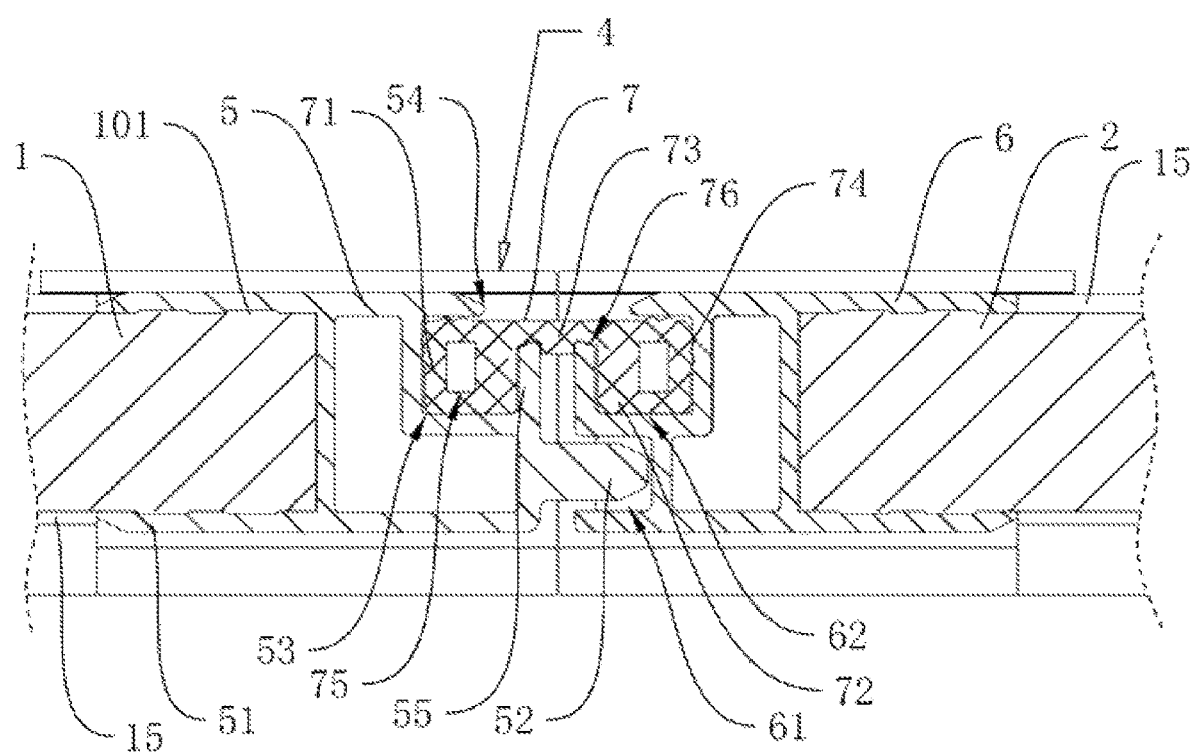
FIG. 4 is a cross-sectional view of a first connecting mechanism according to an embodiment of the present disclosure.

Referring to FIG. 4, the first connecting member 5 includes a first mounting portion 51 for mounting of the first plate 1 and an insertion portion 52 connected to the second connecting member 6. The insertion portion 52 is disposed on a side of the first connecting member 5 away from the first mounting portion 51. The first mounting portion 51 has a groove for the first plate 1 to fit into and insert. A plurality of strip-shaped protruding portions 101 arranged along a length direction of the groove are disposed on upper and lower surfaces of the first plate 1 mounted in the groove. The inner wall of the groove is provided with a relief groove corresponding to the protruding portion 101 to cooperate with the protruding portion 101, thereby making the connection tighter. The insertion portion 52 is an insertion strip disposed perpendicularly to the side wall of the first plate 1. The second connecting member 6 includes a second mounting portion for mounting of the second plate 2. The mounting structure of the second plate 2 and the second mounting portion is consistent with the mounting structure of the first plate 1 and the first mounting portion 51. The second connecting member 6 is provided with a movable groove 61 for the insertion portion 52 to enter and disengage. The thickness of the movable groove 61 may be set to be greater than the thickness of the insertion strip. The end of the insertion strip along the long side is provided with chamfers to facilitate entry and exit of the movable groove 61.

Referring to FIG. 4, the first connecting member 5 is provided with a first connecting groove 53, the second connecting member 6 is provided with a second connecting groove 62, the elastic connecting mechanism 7 is made of a material with deformation ability, and the elastic connecting mechanism 7 includes a first connecting portion 71 and a second connecting portion 72. The first connecting portion 71 and the second connecting portion 72 respectively correspond to the first connecting groove 53 and the second connecting groove 62. The first connecting portion 71 and the second connecting portion 72 are sequentially and cooperatively engaged in the first connecting groove 53 and the second connecting groove 62, so that the first connecting member 5 and the second connecting member 6 are movably connected. Preferably, the elastic connecting mechanism 7 can be made of a rubber material, has deformation, and is waterproof. Further, the elastic connecting mechanism 7 further includes an intermediate portion 73. The first connecting portion 71 and the second connecting portion 72 are symmetrically arranged along two long sides of the intermediate portion 73. The first connecting groove 53 and the second connecting groove 62 have notches 54 for the intermediate portion 73 to pass through. The notch 54 is provided with a constriction portion 55 that restricts the first connecting portion 71 or the second connecting portion 72 from being separated from the notch 54. The constriction portion 55 can be arranged in a plate shape along the length direction of the elastic connecting mechanism 7, and the end of the constriction portion 55 may be provided with rounded corners to reduce wear on the elastic connecting mechanism 7.

Referring to FIG. 4, the intermediate portion 73 is provided with a clamping groove 76 for clamping of the constriction portion 55, to restrict the elastic connecting mechanism 7 from being separated from the first connecting groove 53 and the second connecting groove 62. A plurality of engaging protruding strips 74 are disposed on a surface of the first connecting portion 71 corresponding mounted in the first connecting groove 53. The engaging protruding strips 74 are arranged along the length direction of the first connecting portion 71. The first connecting portion 71 has a cavity 75 formed by penetrating two end faces along the length direction, so that the first connecting portion 71 has a deformation space in the first connecting groove 53 to reduce the possibility of detaching from the notch 54. A plurality of engaging protruding strips 74 are disposed on a surface of the second connecting portion 72 corresponding mounted in the second connecting groove 62. The engaging protruding strips 74 extend along the length direction of the second connecting portion 72. The second connecting portion 72 also has a cavity 75 penetrating two end faces along the length direction.

Referring to FIG. 3, in a preferred implementation, in this embodiment, two end faces along the length direction of the first connecting member 5 are disposed through to form the first connecting groove 53, and two end faces along the length direction of the second connecting member 6 are disposed through to form the second connecting groove 62. To facilitate mounting, the first connecting portion 71 and the second connecting portion 72 can slide into the first connecting groove 53 and the second connecting groove 62 simultaneously.

Figure 5:
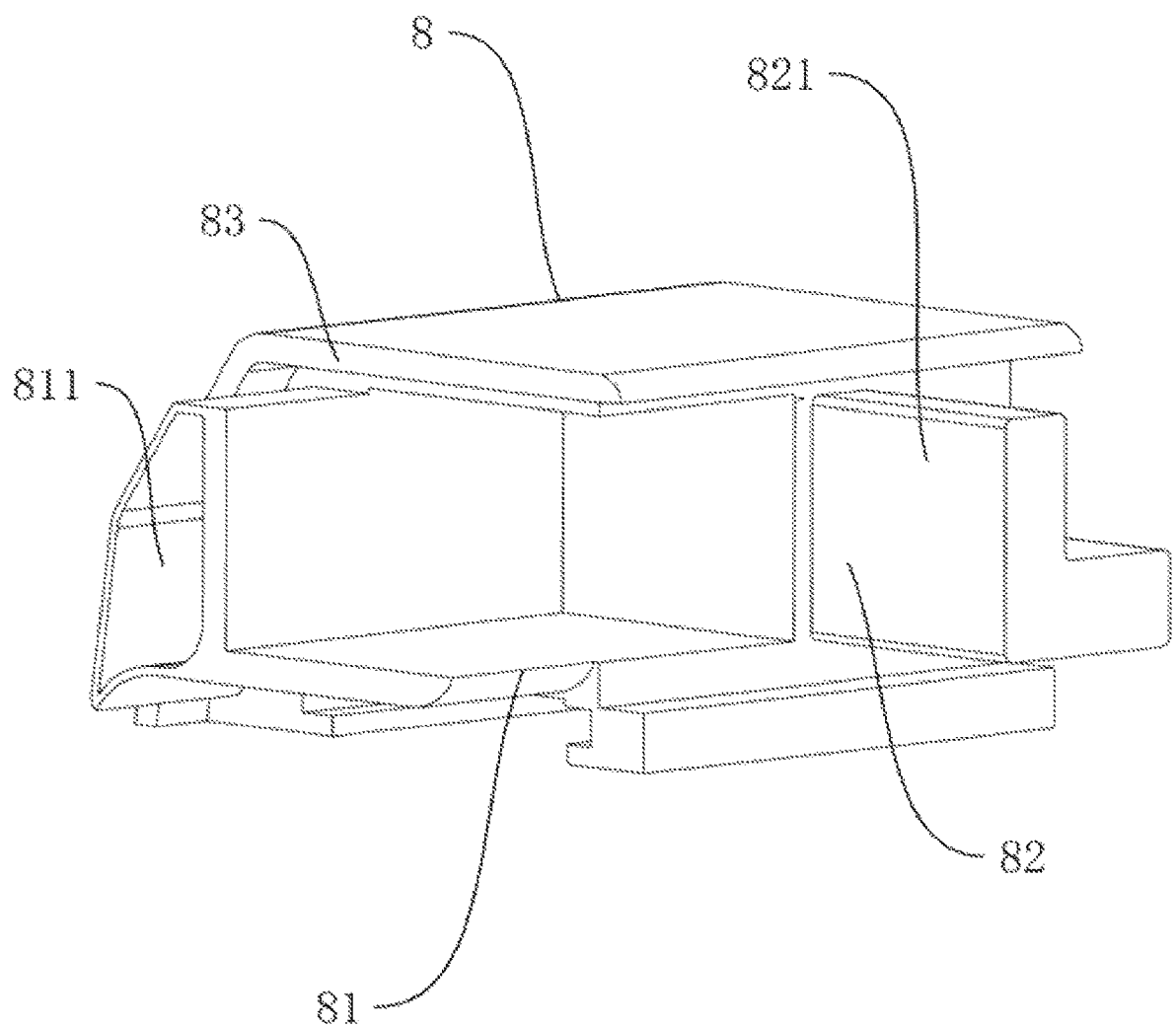
FIG. 5 is a schematic structural diagram of a first fixing member according to an embodiment of the present disclosure.

Referring to FIG. 3 and FIG. 5, the first plate 1 is provided with corners 102 at two ends of the side close to the first connecting member 5, and the second plate 2 is also provided with corners 102 at two ends of the side close to the second connecting member 6. The first fixing member 8 includes a first fixing portion 81 for mounting of the corners 102 of the first plate 1 and a second fixing portion 82 for mounting of an end of the first connecting member 5. The first fixing portion 81 includes a first engaging joint 811. The edge strip 15 clamped on the first plate 1 has a groove for the first engaging joint 811 to be inserted. The first fixing portion 81 is clamped on the corners 102 of the first plate 1 and two adjacent edges respectively abut against the end faces of the first connecting member 5 and the edge strip 15. The second fixing portion 82 includes a second engaging joint 821. The first connecting member 5 has a through groove for the second engaging joint 821 to be inserted into. The first fixing member 8 further includes an outer plate 83 pressed on the edges of the first connecting member 5 and the edge strip 15. The two second fixing members 9 correspond to the two first fixing members 8 and are arranged symmetrically. The second fixing member 9 includes a third fixing portion 91 for mounting of the corners 102 of the second plate 2 and a fourth fixing portion 92 for mounting of an end of the second connecting member 6. In the unfolded state, opposite outer walls of the two corresponding first fixing members 8 and second fixing members 9 abut against each other.

Figure 6:
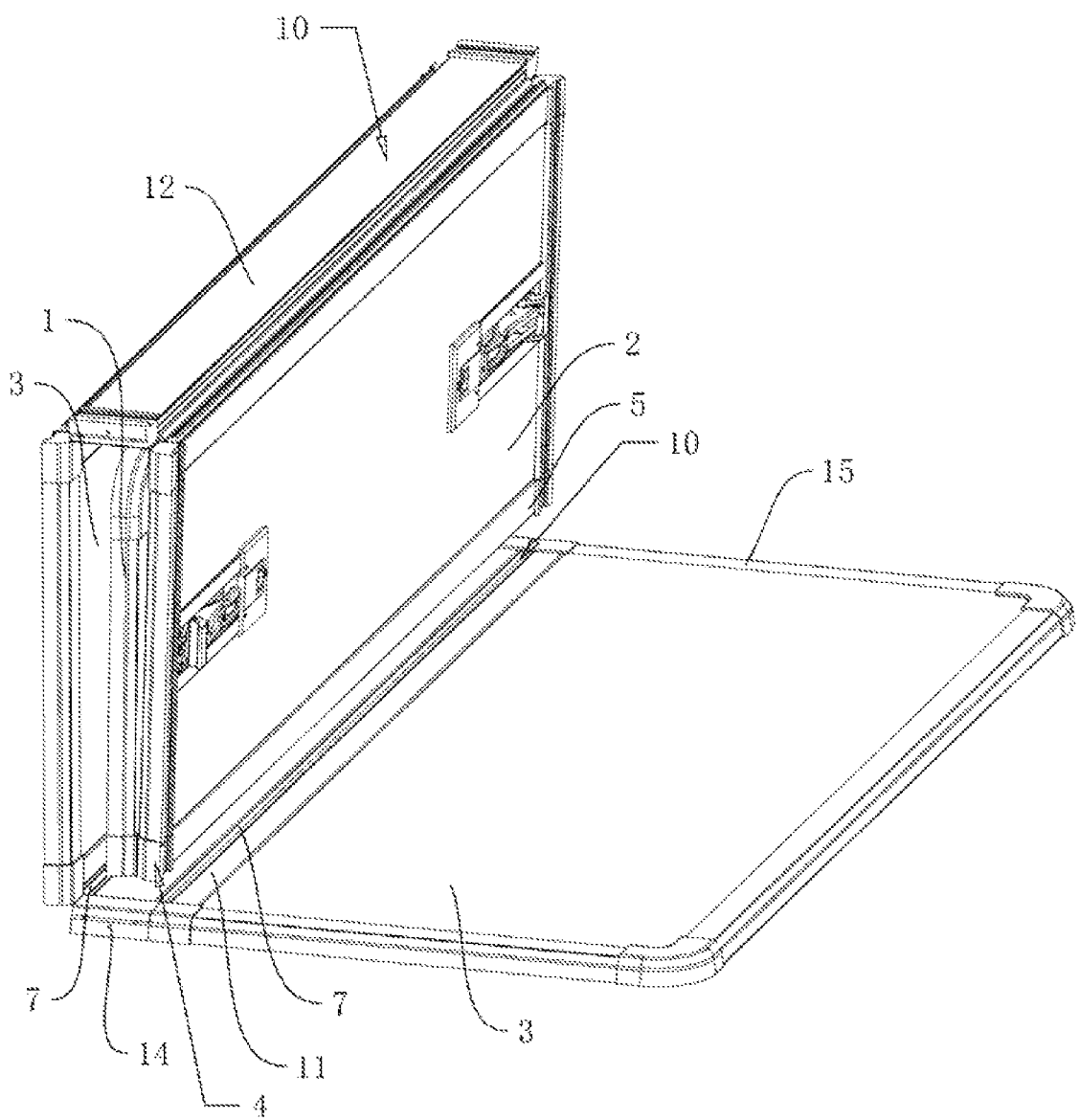
FIG. 6 is a schematic structural diagram of a folding pickup truck bed cover when two extension plates are used according to an embodiment of the present disclosure.
Figure 7:
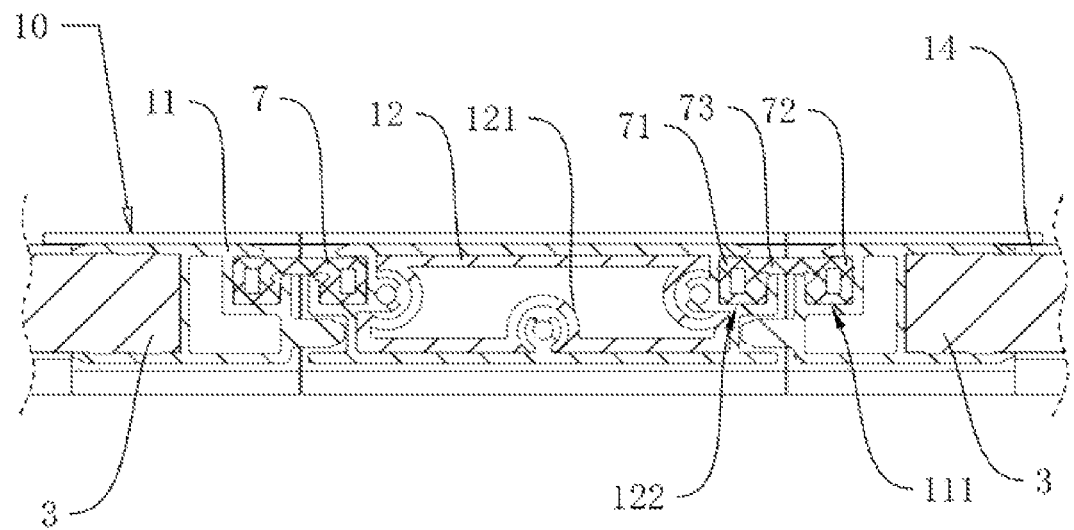
FIG. 7 is a cross-sectional view of a second connecting mechanism according to an embodiment of the present disclosure.

Referring to FIG. 6 and FIG. 7, the folding pickup truck bed cover further includes a plurality of extension plates 3 arranged and mounted on a side of the second plate 2 away from the first plate 1. A second connecting mechanism 10 is disposed between the second plate 2 and the extension plate 3 and between the two adjacent extension plates 3. The second connecting mechanism 10 includes two symmetrically arranged third connecting members 11 and an extension member 12 connected between the two third connecting members 11. The structure of the third connecting member 11 is consistent with the structure of the first connecting member 5. The width of the extension member 12 is set correspondingly according to a quantity of extension plates 3, so that the first plate 1, the second plate 2, and the extension plates 3 can be folded and stored. The extension member 12 and the third connecting member 11 are connected through the elastic connecting mechanism 7, and the mounting structure is consistent with the mounting structure of the elastic connecting mechanism 7 mounted between the first connecting member 5 and the second connecting member 6. Therefore, details are not described herein again.

Figure 8:
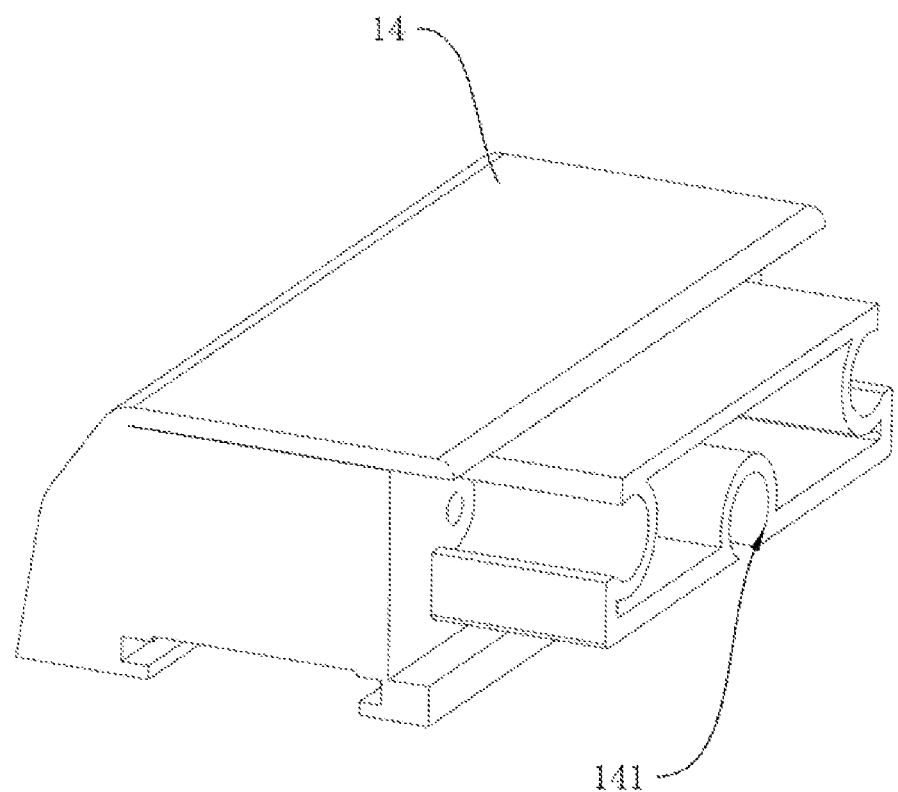
FIG. 8 is a schematic structural diagram of a second fixing member according to an embodiment of the present disclosure.

Referring to FIG. 8, the third connecting member 11 has third fixing members 13 symmetrically mounted at two ends along the length direction. The extension member 12 has fourth fixing members 14 symmetrically mounted at two ends along the length direction. The structure of the third fixing member 13 is the same as that of the first fixing member 8. The mounting structures of the third connecting member 11 and the third fixing member 13 are also consistent with the mounting structures of the first connecting member 5 and the first fixing member 8. Two end faces of the third connecting member 11 along a length direction are disposed through to form a third connecting groove 111, two end faces of the extension member 12 along a length direction are disposed through to form a fourth connecting groove 122, the first connecting portion 71 and the second connecting portion 72 are respectively and cooperatively engaged in the third connecting groove 111 and the fourth connecting groove 122, third fixing members 13 are symmetrically mounted at two ends of the third connecting member 11 along the length direction, and fourth fixing members 14 are symmetrically mounted at two ends of the extension member 12 along the length direction. The two end faces of the fourth fixing member 14 respectively abut against the two end faces of the two adjacent third fixing members 13. An interior of the extension member 12 is a hollow structure, the hollow structure penetrates the two end faces of the extension member 12 along the length direction of the extension member 12, a plurality of reinforcing portions 121 are disposed inside the extension member 12, and the fourth fixing member 14 is provided with an insertion groove 141 for insertion of an end of the reinforcing portion 121.

The implementation principle of the folding pickup truck bed cover in the embodiments of the present disclosure is as follows:

The first connecting member 5 and the second connecting member 6 are respectively mounted on the adjacent sides of the first plate 1 and the second plate 2. The first connecting portion 71 and the second connecting portion 72 of the elastic connecting mechanism 7 are slidably engaged into the first connecting groove 53 and the second connecting groove 62, and the first fixing member 8 and the second fixing member 9 are mounted at two ends of the first connecting member 5 and the second connecting member 6 to further improve the structural strength and sealing performance. The elastic connecting mechanism 7 has the deformation ability to realize the flipping and unfolding of the first plate 1 and the second plate 2.

The present disclosure also describes various embodiments for connecting mechanism and a pickup truck bed cover having the connecting mechanism, some non-limiting exemplary embodiments are described below.

Embodiment 2-1

Figure 9:
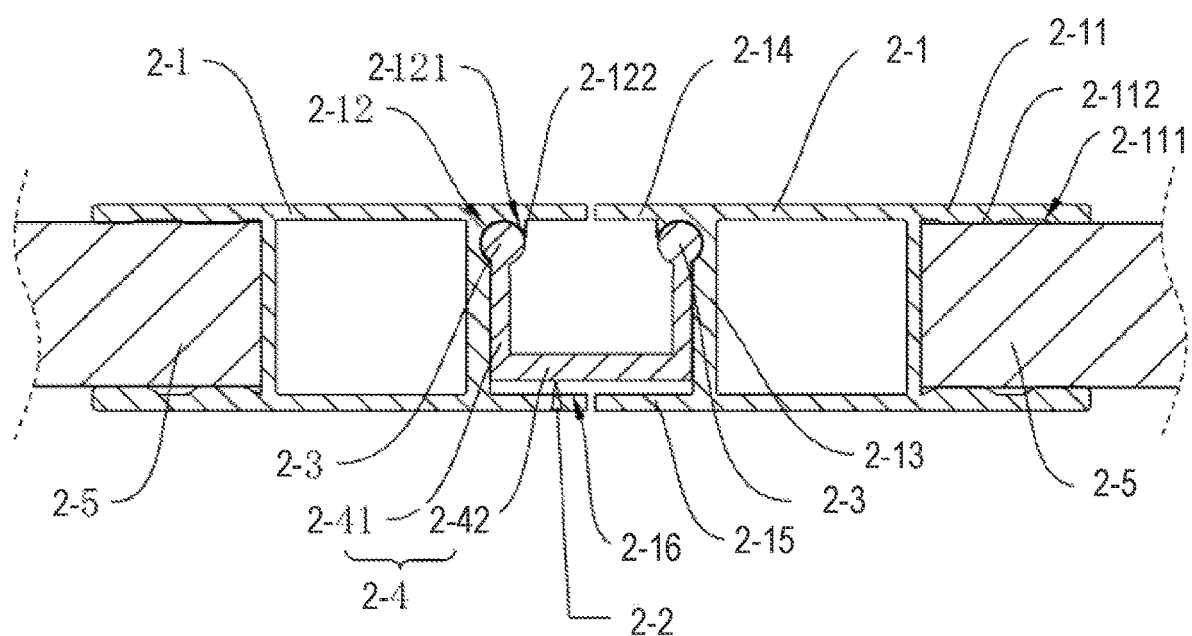
FIG. 9 is a cross-sectional view of a connecting mechanism in an unfolded state according to Embodiment 2-1 of the present disclosure.
Figure 10:
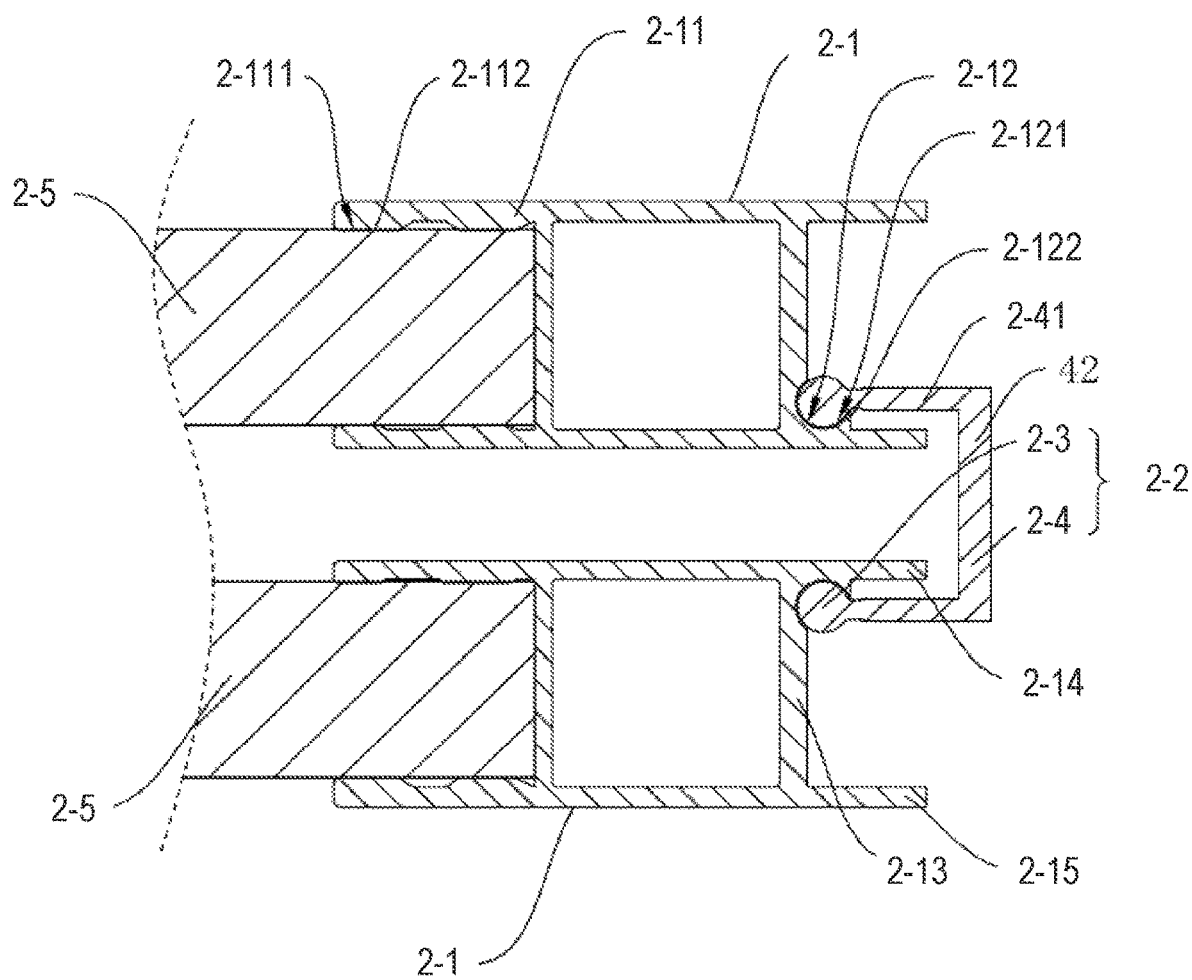
FIG. 10 is a cross-sectional view of a connecting mechanism in a folded state according to Embodiment 2-1 of the present disclosure.

Referring to FIG. 9 and FIG. 10, an embodiment of the present disclosure discloses a connecting mechanism, configured to connect two adjacent mounted members 2-5 and including two symmetrically arranged connecting units 2-1 and an extension unit 2-2 rotatably connected to the two connecting units 2-1. The connecting unit 2-1 includes a mounting portion 2-11 for mounting the mounted member 2-5, and the extension unit 2-2 includes two rotating members 2-3 and an extension member 2-4 connected between the two rotating members 2-3 The connecting mechanism has an unfolded state and a folded state. In the unfolded state, the two connecting units 2-1 rotate until the mounted members 2-5 spread out in the horizontal direction; and in the folded state, the two connecting units 2-1 rotate until the mounted members 2-5 are vertically stacked. Further, widths of the extension members 2-4 gradually increase along an arrangement direction according to a quantity of mounted members 2-5, to implement one-way folding of the plurality of mounted members 2-5.

Referring to FIG. 9, an end of the connecting unit 2-1 away from the mounting portion 2-11 is provided with a first rotating groove 2-12 for cooperative rotation with the rotating member 2-3, the first rotating groove 2-12 has a first notch 2-121 and a first limiting portion 2-122 extends from an edge of the first notch 2-121, and the first limiting portion 2-122 is configured to restrict the rotating member 2-3 from being separated from the first rotating groove 2-12 from the first notch 2-121. The first rotating groove 2-12 is formed through two end faces of the connecting unit 2-1 along the length direction. The rotating member 2-3 is slidably mounted from the end face of the connecting unit 2-1 into the first rotating groove 2-12 for easy mounting.

Referring to FIG. 9, in this embodiment, the connecting mechanism is applied when there are only two mounted members 2-5, or between two mounted members 2-5 located at the front end of two or more mounted members 2-5 arranged. In the foregoing case, the extension member 2-4 is set in a plate shape, the two rotating members 2-3 are symmetrically arranged at two ends of the extension member 2-4. In this case, the extension member 2-4 and the rotating member 2-3 can be integrally formed, that is, the extension unit 2-2 is one component, and the extension unit 2-2 is made of a hard metal material. The extension member 2-4 may be set in a U shape, including two vertical sections 2-41 connected to the rotating member 2-3, and a horizontal section 2-42 connecting the two vertical sections 2-41. In other implementations, the extension member 2-4 may be set in an arc-shaped U shape.

Referring to FIG. 9, the connecting unit 2-1 includes a first side 2-13 located at an end away from the mounting portion 2-11 and a first edge 2-14 and a second edge 2-15 respectively connected to two ends of the first side 2-13, and the first sides 2-13, the first edges 2-14 and the second edges 2-15 of the two connecting units 2-1 surround and form a first accommodation cavity 2-16 for accommodating the extension unit 2-2. A gap needs to be left between the first edge 2-14 and the second edge 2-15 of the two connecting units 2-1 to facilitate folding. The first rotating groove 2-12 is provided at the junction of the first edge 2-14 and the first side 2-13. In the unfolded state, the extension unit 2-2 is located inside the accommodation cavity, outer walls of two vertical sections abut against the first side 2-13, and the horizontal section 2-42 is close to the second edge 2-15 with a gap in between, thereby limiting a flipping range of the connecting unit 2-1 and the extension unit 2-2, so that the mounted member 2-5 can be folded in only one direction, and the unfolded structure can be more stable.

The implementation principle of Embodiment 2-1 of the present disclosure is as follows:

The mounted member 2-5 is mounted on the mounting portion 2-11 of the connecting unit 2-1. The extension unit 2-2 slides in from the end of the connecting unit 2-1 so that the rotating member 2-3 is mounted in the first rotating groove 2-12, to cooperate to achieve one-way folding of two adjacent mounted members 2-5. The connecting mechanism has a simple structure and low costs.

Embodiment 2-2

Figure 11:
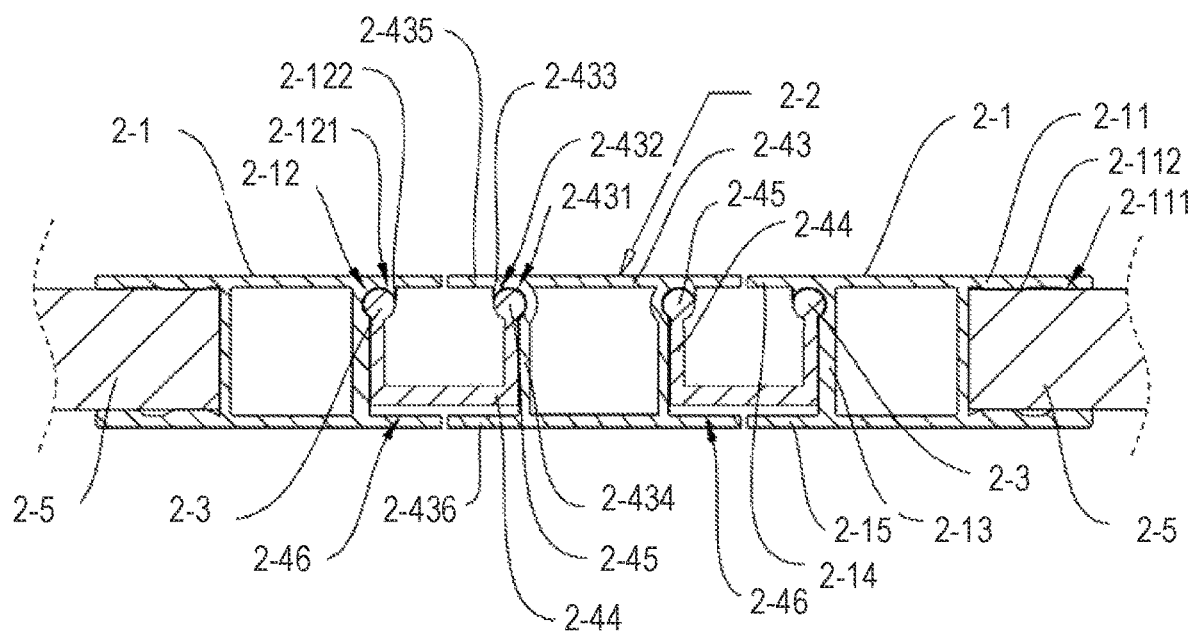
FIG. 11 is a cross-sectional view of a connecting mechanism in an unfolded state according to Embodiment 2-2 of the present disclosure.
Figure 12:
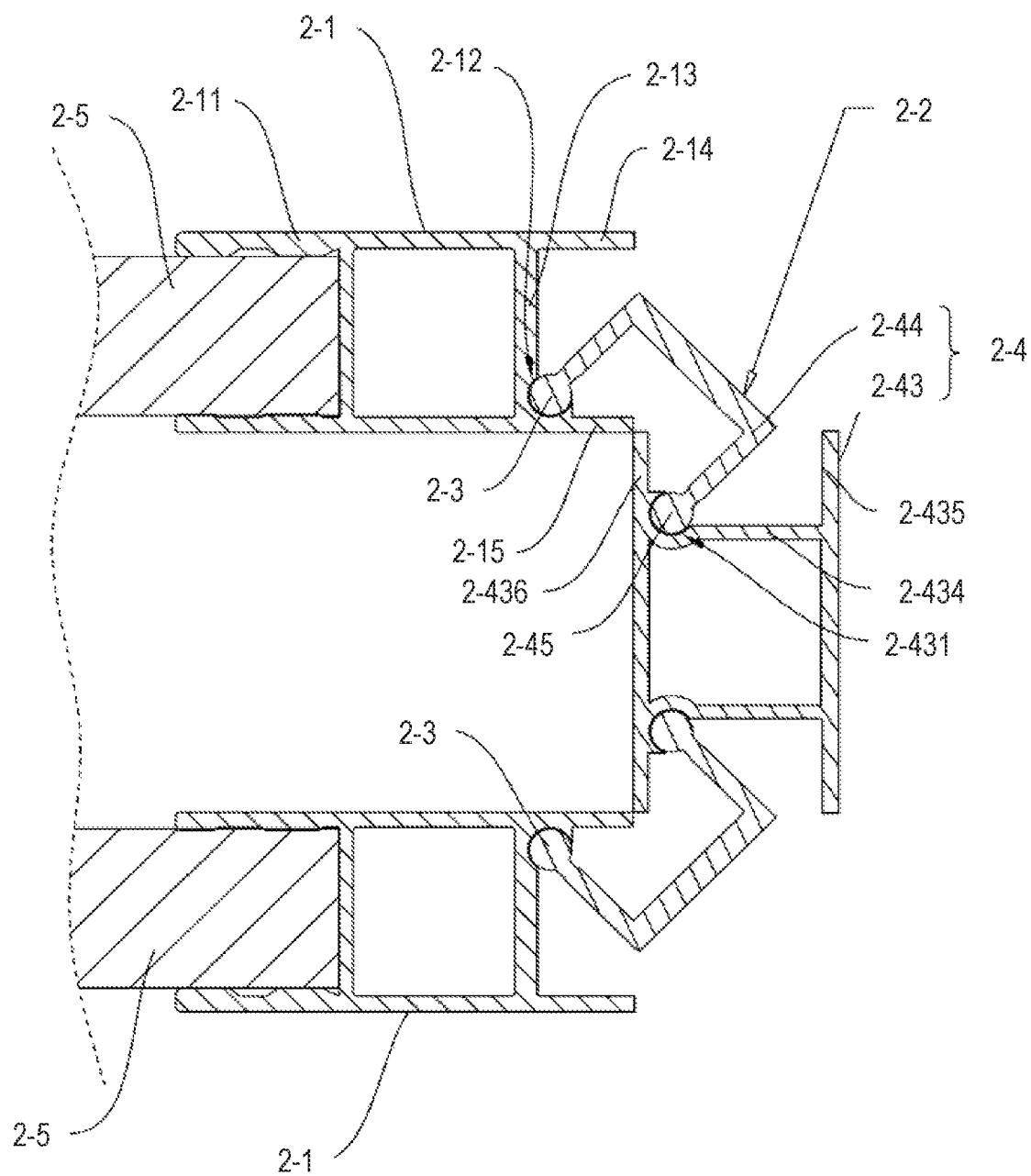
FIG. 12 is a cross-sectional view of a connecting mechanism in a folded state according to Embodiment 2-2 of the present disclosure.
Figure 13:
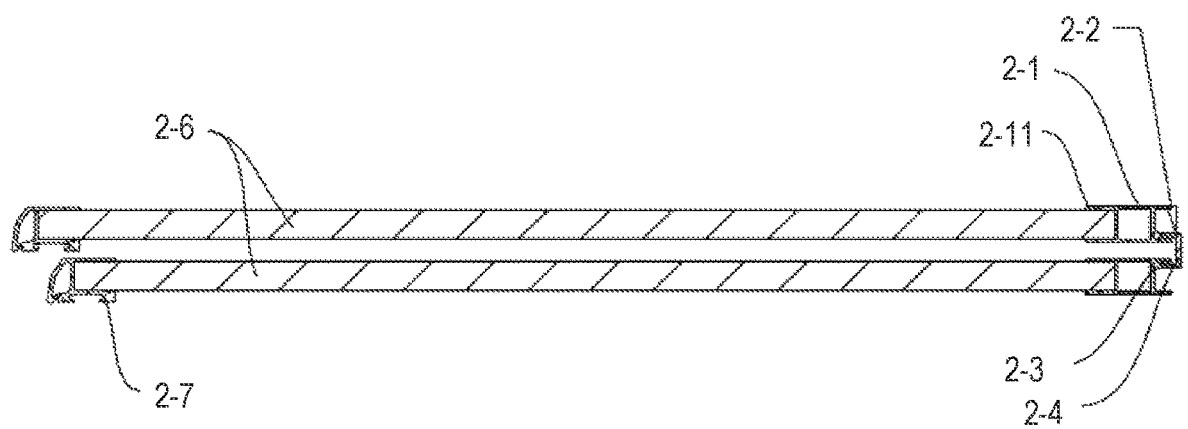
FIG. 13 is a cross-sectional view of a pickup truck bed cover according to Embodiment 2-3 of the present disclosure.

Referring to FIG. 11 and FIG. 12, an embodiment of the present disclosure discloses a connecting mechanism, which is applied between mounted members 2-5 after a second one along an arrangement direction when a quantity of mounted members 2-5 is more than two. The difference from Embodiment 2-1 is that the extension member 2-4 includes an extension portion 2-43 and a connecting portion 2-44 rotatably arranged at two ends of the extension portion 2-43. The widths of the extension portions 2-43 gradually increase according to the arrangement direction of the mounted members 2-5. The connecting portion 2-44 is fixedly connected to the rotating member 2-3. Further, the connecting portion 2-44 and the rotating member 2-3 can be integrally formed through a U-shaped plate and are also made of metal materials, to simplify the structure and increase the strength.

The connecting portion 2-44 has a rotating end 2-45, and the structure of the rotating end 2-45 may be set to be consistent with that of the rotating member 2-3 to facilitate processing and production. The extension portion 2-43 is provided with a second rotating groove 2-431 for cooperative rotation with the rotating end 2-45, the second rotating groove 2-431 has a second notch 2-432 and a second limiting portion 2-433 extends from an edge of the second notch 2-432, and the second limiting portion 2-433 is configured to restrict the rotating end 2-45 from being separated from the second rotating groove 2-431 from the second notch 2-432. Two ends of the extension portion 2-43 facing the connecting portion 2-44 are each provided with a second side 2-434 and a third edge 2-435 and a fourth edge 2-436 respectively connected to two ends of the second side 2-434. In this case, the second sides 2-434, the third edges 2-435, and the fourth edges 2-436 of the extension portion 2-43, together with the first sides 2-13, the first edges 2-14, and the second edges 2-15 of the corresponding connecting unit 2-1, surround and form the second accommodation cavity 2-46 for accommodating the connecting portion 2-44 and the rotating member 2-3. The second rotating groove is provided at the junction of the third edge 2-435 and the second side 2-434. In the unfolded state, the connecting portion 2-44 and the rotating member 2-3 that are fixedly connected are located inside the accommodation cavity, and the two opposite outer walls of the U-shaped plate abut against the first side 2-13 and the second side 2-434 respectively.

The implementation principle of Embodiment 2-2 of the present disclosure is as follows:

The mounted member 2-5 is mounted on the connecting unit 2-1, the rotating member 2-3 cooperates with the first rotating groove 2-12 of the connecting unit 2-1, the rotating end 2-45 of the connecting portion 2-44 cooperate with the second rotating groove 2-431 of the extension portion 2-43 to implement a rotational connection, and the widths of the extension members 2-4 gradually increase according to the arrangement direction of the mounted members 2-5, to implement one-way folding and storage of the plurality of mounted members 2-5.

Embodiment 2-3

Referring to FIGS. 10-13, an embodiment of the present disclosure discloses a pickup truck bed cover, which includes two cover plates 2-6 and the connecting mechanism in Embodiment 2-1. The cover plate 2-6 is the mounted member 2-5 in Embodiment 2-1. There are a plurality of connecting mechanisms and the connecting mechanisms are respectively mounted between two adjacent cover plates 2-6. The mounting portion 2-11 has a connecting groove 2-111 for insertion of an edge of the cover plate 2-6. Two opposite groove walls of the connecting groove 2-111 are provided with protruding strips 2-112 along the length direction to improve the tightness and stability of the mounting structure.

The plurality of cover plates 2-6 are sequentially spliced through the connecting mechanisms to form the bed cover. An edge component 2-7 is disposed on the outer periphery of the bed cover for connecting to the top of the rear bed of the pickup truck. The edge component 2-7 can further improve the mounting stability of the connecting mechanism and the cover plate 2-6.

Embodiment 2-4

Figure 14:
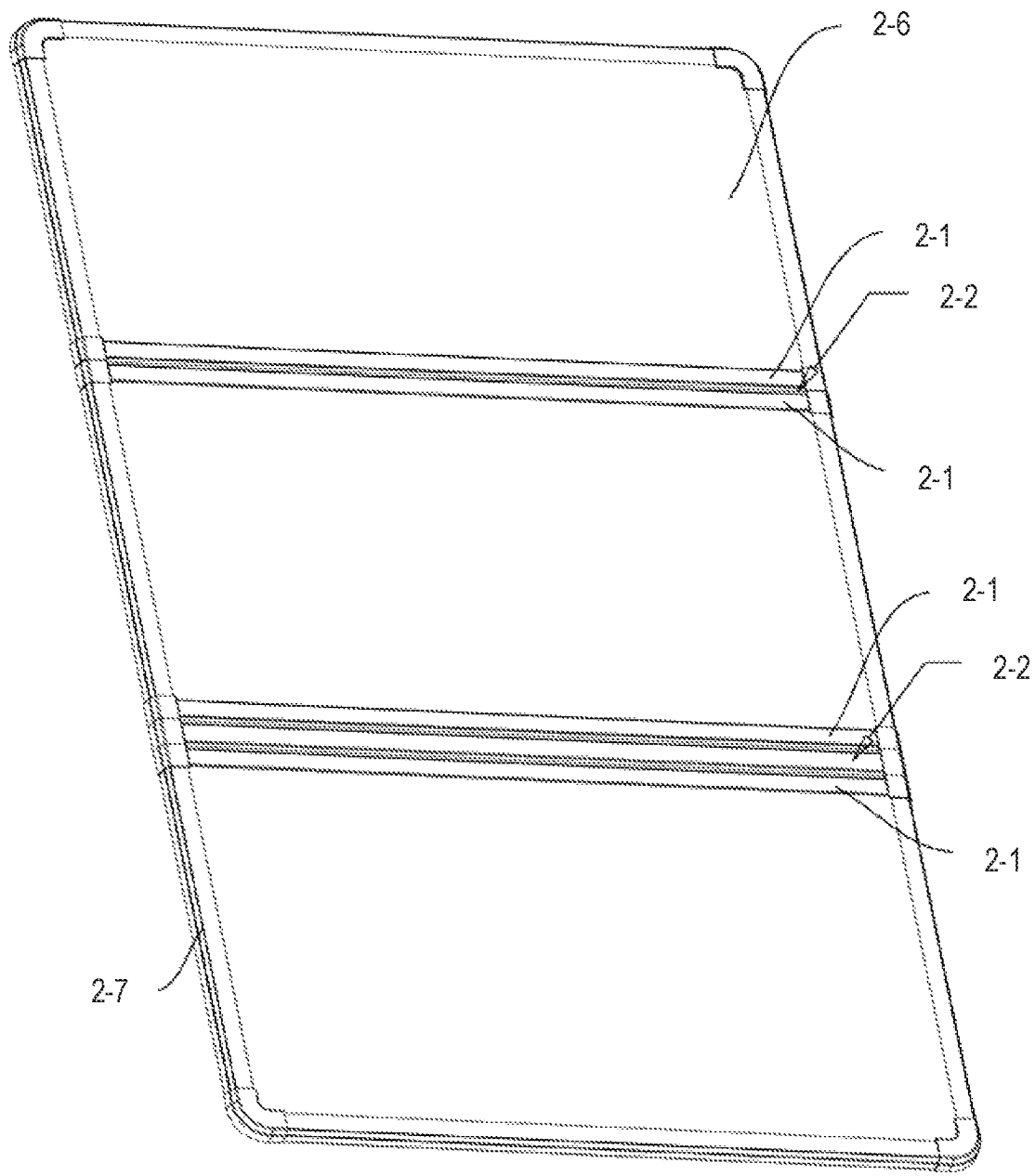
FIG. 14 is a schematic structural diagram of a folding pickup truck bed cover in an unfolded state according to Embodiment 2-4 of the present disclosure.
Figure 15:
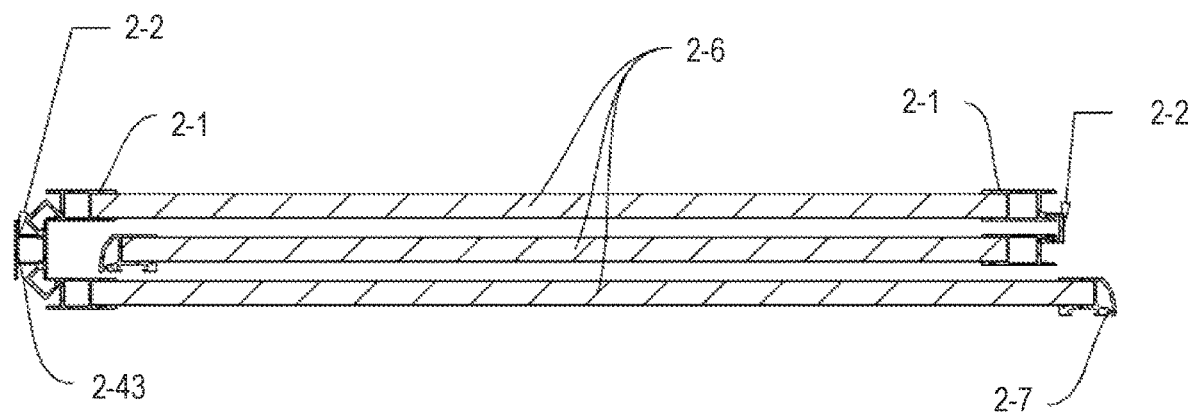
FIG. 15 is a cross-sectional view of a pickup truck bed cover with three cover plates according to Embodiment 2-4 of the present disclosure.
Figure 16:
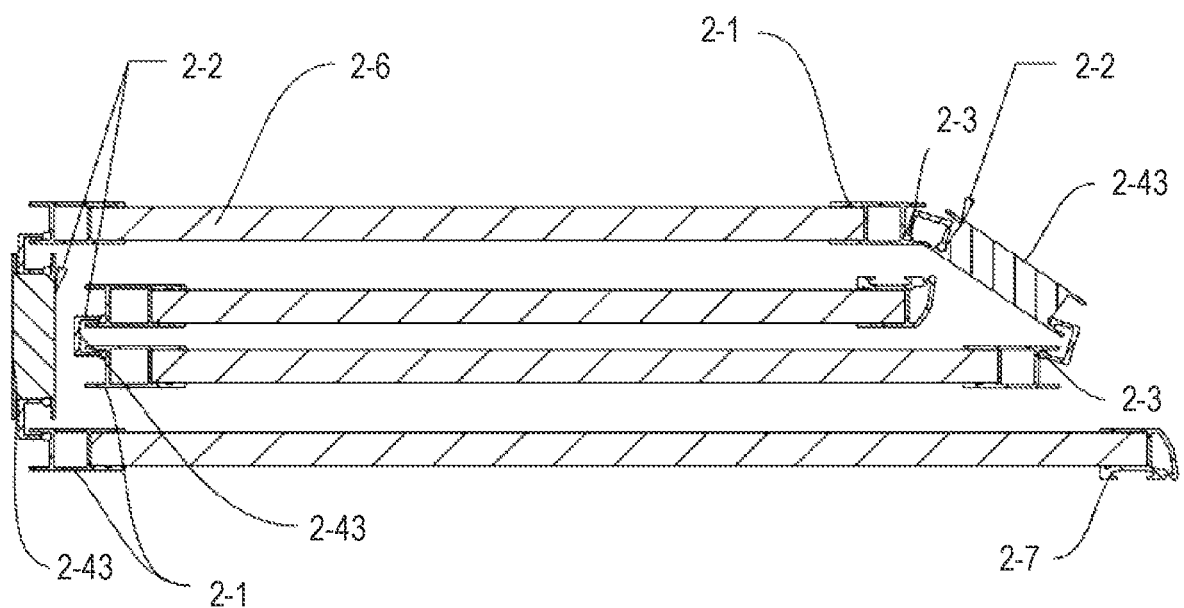
FIG. 16 is a cross-sectional view of a pickup truck bed cover with four cover plates according to Embodiment 2-4 of the present disclosure.

Referring to FIG. 14 to FIG. 16, an embodiment of the present disclosure discloses a pickup truck bed cover, which includes a plurality of cover plates 2-6 arranged sequentially. The cover plate 2-6 is the foregoing mounted member 2-5. The connecting mechanism in Embodiment 2-1 is connected between two cover plates 2-6 located at the front end. The connecting mechanism in Embodiment 2-2 is connected between cover plates 2-6 after the second one along the arrangement direction. Widths of the extension members 2-4 of the connecting mechanisms in Embodiment 2-2 increase sequentially along the arrangement direction of the cover plates 2-6.

The present disclosure also describes the below exemplary embodiments, which serve as examples only and do not limit the applicability of the present disclosure.

Example I

1. A folding pickup truck bed cover, comprising a first plate (1) and a second plate (2), and further comprising a first connecting mechanism (4) and an elastic connecting mechanism (7), wherein:

the first connecting mechanism (4) comprises a first connecting member (5) mounted on a side of the first plate (1) and a second connecting member (6) mounted on a side of the second plate (2);

the elastic connecting mechanism (7) is made of a material with deformation ability, and the elastic connecting mechanism (7) comprises a first connecting portion (71) and a second connecting portion (72);

the first connecting member (5) comprises a first mounting portion (51) for mounting of the first plate (1) and an insertion portion (52) connected to the second connecting member (6), the insertion portion (52) is disposed on a side of the first connecting member (5) away from the first mounting portion (51), the second connecting member (6) comprises a second mounting portion for mounting of the second plate (2), the second connecting member (6) is provided with a movable groove (61) for the insertion portion (52) to enter or disengage, the first connecting member (5) is provided with a first connecting groove (53), and the second connecting member (6) is provided with a second connecting groove (62); and the first connecting portion (71) and the second connecting portion (72) correspond to the first connecting groove (53) and the second connecting groove (62) respectively, and the first connecting portion (71) and the second connecting portion (72) are sequentially and cooperatively engaged in the first connecting groove (53) and the second connecting groove (62), so that the first connecting member (5) and the second connecting member (6) are movably connected.

2. The folding pickup truck bed cover according to the above 1, wherein the elastic connecting mechanism (7) further comprises an intermediate portion (73), the first connecting portion (71) and the second connecting portion (72) are respectively arranged at intervals along a length extension direction of the intermediate portion (73), and notches (54) of the first connecting groove (53) and the second connecting groove (62) are each provided with a constriction portion (55) that restricts the first connecting portion (71) or the second connecting portion (72) from being separated from the notch (54).

3. The folding pickup truck bed cover according to the above 2, wherein the intermediate portion (73) is provided with a clamping groove (76) for clamping of the constriction portion (55).

4. The folding pickup truck bed cover according to the above 2, wherein two end faces of the first connecting member (5) along a length direction are disposed through to form the first connecting groove (53), and two end faces of the second connecting member (6) along a length direction are disposed through to form the second connecting groove (62).

5. The folding pickup truck bed cover according to any one of the above 2 to 4, wherein a surface of the first connecting portion (71) and a surface of the second connecting portion (72) are each provided with at least one engaging protruding strip (74), and the engaging protruding strip (74) extends along a length direction of the elastic connecting mechanism (7).

6. The folding pickup truck bed cover according to the above 5, wherein the first connecting mechanism (4) further comprises first fixing members (8) symmetrically mounted at two ends of the first connecting member (5) and second fixing members (9) symmetrically mounted at two ends of the second connecting member (6); the first fixing member (8) comprises a first fixing portion (81) for mounting of corners (102) of the first plate (1) and a second fixing portion (82) for mounting of an end of the first connecting member (5); the two second fixing members (9) and the two first fixing members (8) are arranged symmetrically in a one-toone correspondence; and the second fixing member (9) comprises a third fixing portion (91) for mounting of corners (102) of the second plate (2) and a fourth fixing portion (92) for mounting of an end of the second connecting member (6).

7. The folding pickup truck bed cover according to the above 6, further comprising a plurality of extension plates (3) arranged and mounted on a side of the second plate (2) away from the first plate (1), wherein a second connecting mechanism (10) is disposed between the second plate (2) and the extension plates (3) and between two adjacent extension plates (3); the second connecting mechanism (10) comprises two symmetrically arranged third connecting members (11) and an extension member (12) connected between the two third connecting members (11); and the extension member (12) and the third connecting members (11) are connected through the elastic connecting mechanism (7).

8. The folding pickup truck bed cover according to the above 7, wherein two end faces of the third connecting member (11) along a length direction are disposed through to form a third connecting groove (111), two end faces of the extension member (12) along a length direction are disposed through to form a fourth connecting groove (122), the first connecting portion (71) and the second connecting portion (72) are respectively and cooperatively engaged in the third connecting groove (111) and the fourth connecting groove (122), third fixing members (13) are symmetrically mounted at two ends of the third connecting member (11) along the length direction, and fourth fixing members (14) are symmetrically mounted at two ends of the extension member (12) along the length direction.

9. The folding pickup truck bed cover according to the above 8, wherein an interior of the extension member (12) is a hollow structure, the hollow structure penetrates the two end faces of the extension member (12) along the length direction of the extension member (12), a reinforcing portion (121) is disposed inside the extension member (12), and the fourth fixing member (14) is provided with an insertion groove (141) for insertion of an end of the reinforcing portion (121).

Example II

10. A connecting mechanism, configured to connect two adjacent mounted members (2-5) and comprising two symmetrically arranged connecting units (2-1) and an extension unit (2-2) rotatably connected to the two connecting units (2-1), wherein the connecting unit (2-1) comprises a mounting portion (2-11) for mounting the mounted member (2-5), and the extension unit (2-2) comprises two rotating members (2-3) and an extension member (2-4) connected between the two rotating members (2-3); and an end of the connecting unit (2-1) away from the mounting portion (2-11) is provided with a first rotating groove (2-12) for cooperative rotation with the rotating member (2-3), the first rotating groove (2-12) has a first notch (2-121) and a first limiting portion (2-122) extends from an edge of the first notch (2-121), and the first limiting portion (2-122) is configured to restrict the rotating member (2-3) from being separated from the first rotating groove (2-12) from the first notch (2-121).

11. The connecting mechanism according to the above 10, wherein the extension member (2-4) is set in a plate shape, the two rotating members (2-3) are symmetrically arranged at two ends of the extension member (2-4), the connecting unit (2-1) comprises a first side (2-13) located at an end away from the mounting portion (2-11) and a first edge (2-14) and a second edge (2-15) respectively connected to two ends of the first side (2-13), and the first sides (2-13), the first edges (2-14) and the second edges (2-15) of the two connecting units (2-1) surround and form a first accommodation cavity (2-16) for accommodating the extension unit (2-2).

12. The connecting mechanism according to the above 11, wherein when the extension unit (2-2) is located inside the first accommodation cavity (2-16), outer walls on two sides of the extension member (2-4) abut against the first side (2-13).

13. The connecting mechanism according to the above 10, wherein the extension unit (2-2) is made of a metal material.

14. The connecting mechanism according to the above 10, wherein the extension member (2-4) comprises an extension portion (2-43) and a connecting portion (2-44) rotatably disposed at two ends of the extension portion (2-43), and the connecting portion (2-44) is fixedly connected to the rotating member (2-3).

15. The connecting mechanism according to the above 14, wherein the connecting portion (2-44) and the rotating member (2-3) are integrally formed.

16. The connecting mechanism according to the above 15, wherein the connecting portion (2-44) has a rotating end (2-45), the extension portion (2-43) is provided with a second rotating groove (2-431) for cooperative rotation with the rotating end (2-45), the second rotating groove (2-431) has a second notch (2-432) and a second limiting portion (2-433) extends from an edge of the second notch (2-432), and the second limiting portion (2-433) is configured to restrict the rotating end (2-45) from being separated from the second rotating groove (2-431) from the second notch (2-432).

17. A pickup truck bed, comprising a plurality of cover plates (2-6) sequentially arranged and the connecting mechanism according to any one of the above 10 to 16, wherein there are a plurality of connecting mechanisms and the connecting mechanisms are respectively mounted between two adjacent cover plates (2-6), and widths of extension members (2-4) in the plurality of connecting mechanisms increase sequentially along an arrangement direction of the cover plates (2-6).

In the embodiments and implementation of this disclosure, any component in the implementations/embodiments may be combined or arranged in any amount or order, as desired. Embodiments and implementations in the disclosure may be used separately or combined in any order.

The above are all preferred embodiments of the present disclosure, and are not intended to limit the scope of protection of the present disclosure. Therefore, any equivalent changes made based on the structure, shape, and principle of the present disclosure shall be covered by the scope of protection of the present disclosure.

While the particular disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:

1. A folding pickup truck bed cover, comprising:
a first plate;
a second plate;
a first connecting assembly; and
an elastic connector, wherein:
the first connecting assembly comprises a first connecting member mounted on a side of the first plate and a second connecting member mounted on a side of the second plate;
the elastic connector is made of a material with deformation ability, and the elastic connector comprises a first connecting portion and a second connecting portion;
the first connecting member comprises a first mounting portion for mounting of the first plate and an insertion portion connected to the second connecting member, the insertion portion is disposed on a side of the first connecting member away from the first mounting portion;
the second connecting member comprises a second mounting portion for mounting of the second plate, the second connecting member is provided with a groove for the insertion portion to enter or disengage;
the first connecting member is provided with a first connecting groove, and the second connecting member is provided with a second connecting groove; and
the first connecting portion and the second connecting portion correspond to the first connecting groove and the second connecting groove respectively, and the first connecting portion and the second connecting portion are cooperatively engaged in the first connecting groove and the second connecting groove, so that the first connecting member and the second connecting member are movably connected.

2. The folding pickup truck bed cover according to claim 1, wherein:
the elastic connector further comprises an intermediate portion,
the first connecting portion and the second connecting portion are respectively arranged with respect to the intermediate portion, and
notches of the first connecting groove and the second connecting groove are each provided with a constriction portion that restricts the first connecting portion or the second connecting portion from being separated from the notch.

3. The folding pickup truck bed cover according to claim 2, wherein:
the intermediate portion is provided with a clamping groove for clamping of the constriction portion.

4. The folding pickup truck bed cover according to claim 2, wherein:
two end faces of the first connecting member along a length direction are disposed through to form the first connecting groove, and two end faces of the second connecting member along a length direction are disposed through to form the second connecting groove.

5. The folding pickup truck bed cover according to claim 2, wherein:
a surface of the first connecting portion and a surface of the second connecting portion are each provided with at least one engaging protruding strip, and the engaging protruding strip extends along a length direction of the elastic connector.

6. The folding pickup truck bed cover according to claim 5, wherein:
the first connecting assembly further comprises:
two first fixing members symmetrically mounted at two ends of the first connecting member, and
two second fixing members symmetrically mounted at two ends of the second connecting member;
each of the two first fixing members comprises a first fixing portion for mounting of corners of the first plate and a second fixing portion for mounting of an end of the first connecting member;
the two second fixing members and the two first fixing members are arranged symmetrically in a one-to-one correspondence; and
each of the two second fixing members comprises a third fixing portion for mounting of a corner of the second plate and a fourth fixing portion for mounting of an end of the second connecting member.

7. The folding pickup truck bed cover according to claim 6, further comprising:
a plurality of extension plates arranged and mounted on a side of the second plate away from the first plate, wherein:
at least one second connecting assembly is disposed between the second plate and the extension plates and between two adjacent extension plates;
the second connecting assembly comprises two symmetrically arranged third connecting members and an extension member connected between the two third connecting members; and
the extension member and the third connecting members are connected through elastic connectors.

8. The folding pickup truck bed cover according to claim 7, wherein:
two end faces of the third connecting member along a length direction are disposed through to form a third connecting groove,
two end faces of the extension member along a length direction are disposed through to form a fourth connecting groove,
the first connecting portion and the second connecting portion are respectively and cooperatively engaged in the third connecting groove and the fourth connecting groove,
third fixing members are symmetrically mounted at two ends of the third connecting member along the length direction, and
fourth fixing members are symmetrically mounted at two ends of the extension member along the length direction.

9. The folding pickup truck bed cover according to claim 8, wherein:
an interior of the extension member is a hollow structure,
the hollow structure penetrates the two end faces of the extension member along the length direction of the extension member,
a reinforcing portion is disposed inside the extension member, and
the fourth fixing member is provided with an insertion groove for insertion of an end of the reinforcing portion.

* * * * *